Patented Apr. 14, 1936

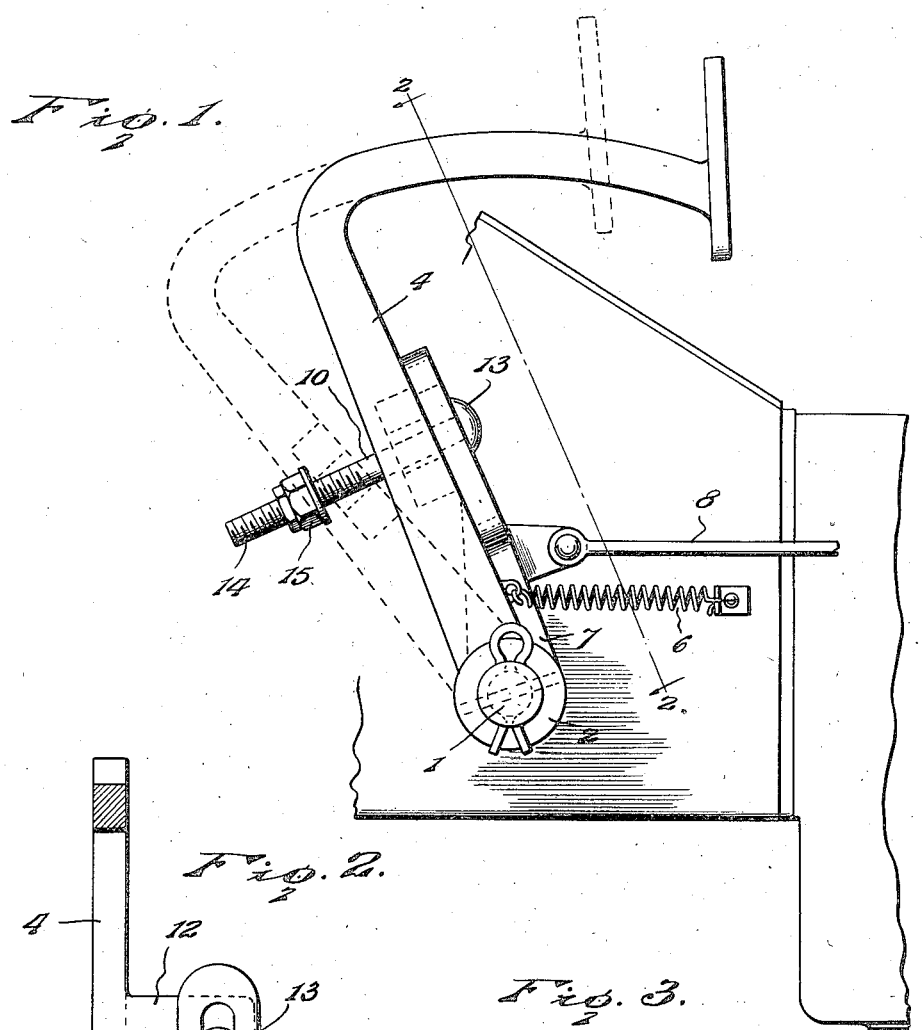

2,037,321

UNITED STATES PATENT OFFICE 2,037,321

CLUTCH AND BRAKE OPERATING MECHANISM

John Hector French, Jr., Athens, Ala.

Application January 14, 1935, Serial No. 1,768

1 Claim. (Cl. 192—13)

This invention relates to means for operating the clutches and brakes of motor vehicles and has for its object the provision of a simple mechanism which may be easily mounted in operative position and by which the clutch and the brake may be controlled through the use of a single treadle. The invention is illustrated in the accompanying drawing and consists in certain novel features which will be particularly defined in the claims following a detail description.

In the drawing:

Figure 1 is a side elevation of an operating mechanism embodying the invention.

Figure 2 is a view showing parts in section on the line 2—2 of Figure 1.

Figure 3 is a detail section on the line 3—3 of Figure 2.

In the drawing, the reference numeral 1 indicates a fulcrum pin or rod which may be secured in any convenient or preferred manner upon the chassis of the vehicle or any other relatively fixed part. Mounted upon this fulcrum or pivot rod are hubs 2 and 3, a treadle 4 being fixed to and extending from the hub 2 to project through the floor boards of the vehicle into a position in which it may be conveniently reached by the foot of the chauffeur. The treadle 4 is shown as secured to the pivot rod 1 by a pin 5 and in such instance the rod 1 is connected by suitable link mechanism with the movable member of the clutch so that when the treadle is depressed the clutch will be open, and a retractile spring 6 is attached to the treadle and to some fixed part to hold the clutch in closed position. An arm 7 extends from the hub 3, and the brake rod 8 is pivoted at its front end to said arm so that, if the arm be depressed, the brake will be applied. The arm 7 is formed with a longitudinal slot 9 in its upper or outer end portion and a pin or bolt 10 is inserted through said slot and through an opening 11 in a lug 12 provided on the side of the treadle and projecting under the arm 7, as clearly shown in Figure 3. The bolt or pin 10 is formed with a head 13 which bears against the arm 7 and spans the slot 9 therein, while its lower or forward end portion is threaded, as shown at 14, to receive a stop nut or abutment 15.

In normal running position the treadle is in the position shown in full lines in Figure 1 and the arm 7 extends upwardly at the side of the treadle and over the lug 12 thereon. The retaining pin or bolt extends loosely through the lug and the arm, and the nut 15 is spaced from the treadle. If the treadle be pressed forwardly to the position shown by dotted lines in Figure 1, the clutch will be partly opened so as to permit shifting of gears or partial coasting of the vehicle so that the treadle may be operated between its normal position and the stop or nut 15 without affecting the brake. If, however, the treadle be pushed beyond the dotted line position, its motion will be transmitted through the nut and the retaining pin so that the head of the pin will press down upon the arm 7 and exert a pull through the brake rod 8 to apply the brakes.

The mechanism is obviously simple, compact and inexpensive and its many advantages will be evident to experienced operators of motor vehicles.

Having thus described the invention, what is claimed as new is:

Structure of the class described including a fulcrum, a clutch operating treadle rockable on the fulcrum and having a lug on one side thereof, a brake applying arm rockably mounted on the fulcrum adjacent said treadle, said arm being slotted, a headed member loosely engaged through said slot in the arm and said lug, the head of said member spanning the slot, and the member having an end extending remotely of said lug and treadle in inoperative position, and a stop element adjustably mounted on said headed member at said remote portion, said stop element and headed member permitting limited movement of the treadle independently of the arm and said element and member cooperating for engaging the lug of the treadle and the arm in extended position whereby said arm will be shifted for setting a brake connected with said arm.

JOHN HECTOR FRENCH, JR.